April 6, 1948.                C. E. GRINSTEAD ET AL                2,439,047
                                  PRESSURE INDICATOR
                                  Filed May 27, 1944
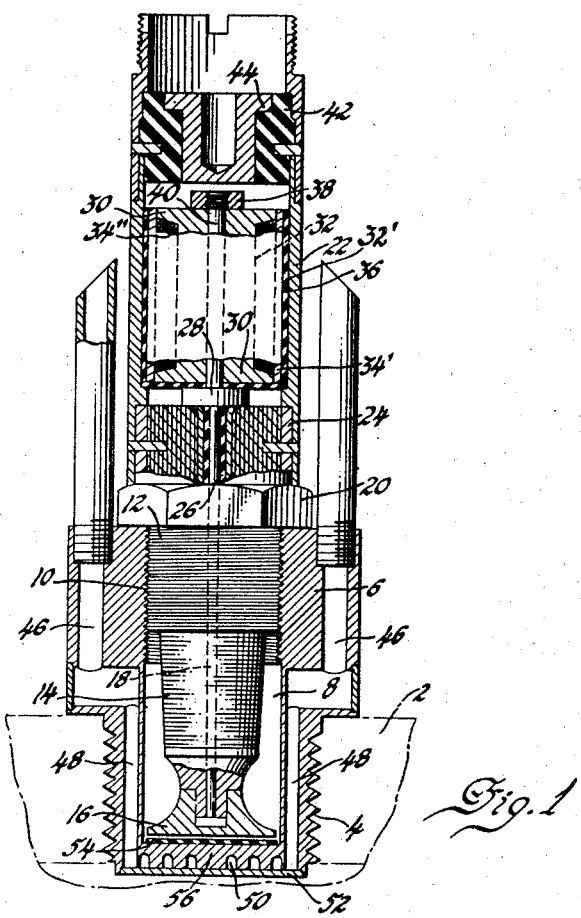
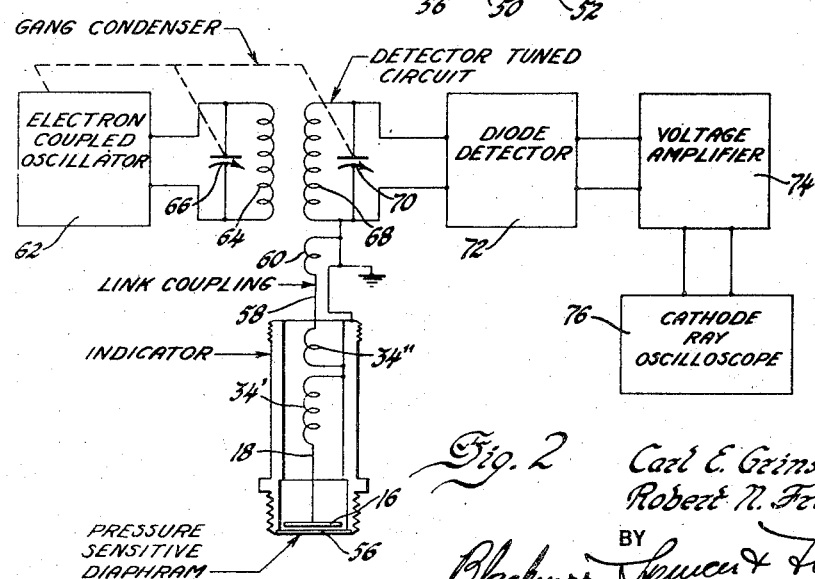
INVENTORS
Carl E. Grinstead &
Robert N. Frawley
BY
Blackmore, Spencer & Flint
ATTORNEYS Patented Apr. 6, 1948

2,439,047

UNITED STATES PATENT OFFICE 2,439,047

PRESSURE INDICATOR

Carl E. Grinstead and Robert N. Frawley, Detroit, Mich., assignors to General Motors Corporation, Detroit, Mich., a corporation of Delaware Application May 27, 1944, Serial No. 537,609

4 Claims. (Cl. 178—44)

This invention relates to indicating and detecting means and more particularly to means for indicating and detecting the pressure changes within the cylinders and manifolds of internal combustion engines. Also the indicator is used to study the detonation characteristics of a fuel in a particular cylinder. This study is very important in the progress and development of more and better fuels to be used. They are also important for a study of the normal operating characteristics of an engine.

It is therefore an object of our invention to provide detecting means actuated by pressure changes within an engine cylinder and engine manifolds.

It is a further object of the present invention to provide means for detecting detonation within an engine cylinder.

It is a still further object of our invention to provide a detector and indicator for visually indicating the knock or detonation characteristics occurring within a cylinder.

With these and other objects in view which will become apparent as the specification proceeds, the embodiments of our invention will be best understood by reference to the following specification and claims and the illustrations in the accompanying drawings, in which:

Figure 1 is an enlarged vertical section taken through the detector unit of our invention.

Figure 2 shows a schematic block and circuit diagram of the various parts of the complete system as used with the detector.

Referring now more specifically to Figure 1, there is therein shown a portion of a cylinder block 2 having a threaded openeng 4 therethrough in which is supported the detector of our invention. This detector is formed of a main body 6 having a large central cavity 8 therein, the upper portion of which is internally threaded as at 10 and supports an electrode assembly which is threaded thereinto. This assembly is formed of an upper threaded member 12 whose threads engage the internal threads 10 and which supports in turn a tapered member 14 of insulating material rigidly connected to an electrode or circular conductive disc 16. A central conductor 18 is positively connected to the plate 16 and extends up through the insulator 14 and continues above the top of the lower member 6.

A nut 20 firmly holds the threaded members 6 and 12 in a given fixed position and also secures the lower end of a cylindrical member 22 to the main body. This member 22 has secured internally a block member 24 having therethrough a small insulating sleeve 26 for supporting the upper end of the electrode member 18 which extends up through a coil support disc 28 and is connected to a coil. A spool-shaped assembly comprising two end discs 30 connected by a central portion 32 and an outer cylindrical member 32' all of which are formed of magnetic shielding material such as pressed powdered iron comprise a closed magnetic core and act as a mounting for a pair of coils 34' and 34". This assembly is encased within an insulating cup 36 which insulates it from the outer casing. A lock nut 38 is fastened to a central rod 40 which extends up from the coil supporting disc 28 to clamp the spool in place. There are two coils 34' and 34" wound on the member 30 as will be more clearly explained in the description of Figure 2.

The upper portion of the central opening within the member 22 is occupied by an insulating block 42 which contains a plug-in connector 44 for power connections to the unit. The main body 6 of the detector is provided with a series of coolant flow openings 46 and 48 through which water or similar cooling fluid may be allowed to flow for cooling this portion of the device if necessary inasmuch as internal combustion engines very often attain relatively high temperatures. The diaphragm base 56 of the member around the plate 16 is also provided with a series of cross-connected flues 50 which are connected with the ducts 48 permitting the flow of water on the lower face of the detector. A sealing plate 52 fixedly secured across this face seals this end of the detector. A disc of insulating material 54 is inserted between the upper face of the diaphragm member 56 and the lower face of the conductive disc 16.

It will thus be obvious that as pressure within the cylinder changes, diaphragm 56 and disc 52 will be forced vertically, dependent upon the internal pressure, and vary the distance between that and the disc 16 supported on the insulating member 14. Since disc 16 is insulatably supported, it acts as a condenser with the face 56, and this variation in space effects a proportional change in capacity which is proportional to the change in pressure and may be usefully employed for indicating. Referring now more particularly to Figure 2, the detector per se is shown diagrammatically and the insulated condenser plate 16 is shown in juxtaposition to the sensitive diaphragm 56. Plate 16 it will be noted is connected through line 18 to an inductance coil 34' on spool 30, 32 which, as before mentioned, is mounted in inductive relation with a second coil 34", the latter being connected by line 58 which may be of substantial length as it may be necessary to position the indicating apparatus at some remote point from the actual engine and is terminally connected to a coupling coil 60, the opposite end of which is connected to ground as is the diaphragm or casing of the detector.

The indicating circuit used with this device comprises an oscillator 62 which feeds into a tuned circuit comprising inductance coil 64 in a variable condenser 66 coupled to a second tuned circuit composed of a coil 68 and a further variable condenser 70, the latter tuned circuit being directly connected to a detector 72 which is then coupled to an amplifier 74, the output of which is fed directly into an oscilloscope 76. The condensers controlling the tuning of the oscillator and the two tuned coupling circuits controlled by condensers 66 and 70 are all operated simultaneously by the same control so that they will maintain the same frequency. Therefore, if the oscillator provides energy to the coupling circuit 66—64, energy will be transferred to the associated circuit 68 and 70, and since the two are tuned to the same frequency and to the frequency of the oscillator, the maximum amount of energy will be transferred to the detector for amplification and visual indication on the cathode ray oscilloscope.

If, now, we consider the effect of coil 60 which is inductively associated with coil 68, with the condenser 16—56 remaining fixed, no effect will be noticed on the energy transmission between the oscillator and the detector as above described. However, if the capacity is changed by diaphragm movement, this change will be reflected through associated coils 34' and 34" to coil 60 which will then change the loading on the secondary coupling circuit 68—70 to a degree dependent upon the change in this capacity and this variation will make a decided variation in the energy flow in this circuit and therefore an indication on the cathode ray oscilloscope. Since there is no capacity in the link-coupled circuit incorporating coils 60 and 34" and connecting line 58, this line may be relatively long and will not be affected by any changes in cable capacitance, but will only show an indication when there is an actual capacity change generated by the movement of the sensitive diaphragm as affected by the pressure within the cylinder.

Therefore, as the pressure changes within the cylinder, the diaphragm 56 will move with respect to the plate 16 and vary the electrical capacitance of the condenser formed thereby. This will affect the reactance of the circuit formed by this capacity and the inductance 34', which change will be reflected into the link circuit of coils 34" and 60 and transmitted to alter the loading on the tuned coupling circuit 68—70 which will give a proportional reading on the oscilloscope and the operator may thus study the detonations as indicated on the oscilloscope.

If the detector unit becomes too hot, then water or other suitable coolant may be circulated through the system previously described to keep the temperature down. If not needed, it is not necessary from the operating standpoint of the unit.

We claim:

1. In detecting means, a substantially cylindrical housing, a deformable wall acting as a closure member for one end of the cylinder, a disc insulatably mounted within the housing and spaced a short distance from the deformable wall forming a condenser therewith, a magnetic closed core mounted within the housing, and a plurality of induction coils mounted on said core and totally enclosed thereby, one of which is electrically connected to said condenser and the other adapted to be connected to remote indicating apparatus.

2. In detecting means, a housing, one wall of which is sufficiently thin to be deformed by ambient pressure thereon, a disc insulatably mounted in spaced relation to the wall within the housing to form a condenser therewith, a pair of inductance coils mounted in the housing, an oscillator, a detector, a pair of similar coupled tuned circuits interconnecting the oscillator and detector, means for connecting one of said coils to the condenser, a coil inductively associated with the coupled tuned circuits and connected to the other coil of the pair, so that as the wall moves, the characteristics of the pick-up circuit will vary, which will be reflected back to the coil associated with the tuned coupling circuits and vary the loading on the tuned circuit connected to the detector input.

3. In detecting means, a substantially cylindrical housing, a deformable wall acting as a closure member for one end of the housing, a conductive disc insulatably mounted within the housing spaced a short distance from the deformable wall and forming therewith an electrical condenser, a spool formed of powdered iron mounted within said housing, a pair of coils mounted on said spool, a cylindrical powdered iron shield completing the core and enclosing the coils so that the losses in the inductive means are maintained at a low level and means connecting one of said coils to the disc and the other adapted to be connected to remote indicating apparatus.

4. In detecting means, a pick-up unit whose electrical characteristics are altered by a variation in ambient conditions that it is desired to indicate, an oscillator for generating high frequency power, a detector, a pair of similar coupled tuned circuits interconnecting the oscillator and detector and a low impedance line coupling the pick-up unit with the tuned circuits so that a variation in the pick-up is introduced into the coupling circuits and an indication obtained at the detector.

CARL E. GRINSTEAD.
ROBERT N. FRAWLEY.

REFERENCES CITED

The following references are of record in the file of this patent:

UNITED STATES PATENTS

| Number | Name | Date |
|---|---|---|
| 1,939,067 | Legg | Dec. 12, 1933 |
| 1,956,403 | Scott | Apr. 24, 1934 |
| 2,113,376 | Janco | Apr. 5, 1938 |
| 2,178,471 | DeBruin | Oct. 31, 1939 |
| 2,249,573 | Morse, Jr. | July 15, 1941 |
| 2,250,471 | DeBruin | July 29, 1941 |
| 2,288,838 | Pike et al. | July 7, 1942 |
| 2,345,071 | Reynst et al. | Mar. 28, 1944 |
| 2,355,088 | Lavoie | Aug. 8, 1944 |
| 2,372,701 | Antalek | Apr. 3, 1945 |